Oct. 1, 1968    J. J. FINN    3,404,256

ELECTRICALLY HEATED VESSEL

Filed June 24, 1965

INVENTOR.
John J. Finn
BY Ralph Hammar
  attorney

United States Patent Office 3,404,256
Patented Oct. 1, 1968

3,404,256
ELECTRICALLY HEATED VESSEL
John J. Finn, Erie, Pa., assignor to Glenn Electric Heater Corporation, Erie, Pa., a corporation of Pennsylvania
Filed June 24, 1965, Ser. No. 466,572
4 Claims. (Cl. 219—311)

ABSTRACT OF THE DISCLOSURE

An electrically heated aluminum vessel with a curved exterior surface has an aluminum bar arc welded at its edges to the surface and with exterior grooves replaceably receiving a sheathed electric heating element. This gives the heat transfer of a cast in element without its disadvantages.

---

This invention is an electrically heated vessel having replaceable electric heating elements which have the high heat transfer of cast electric heating elements.

Figure 1:
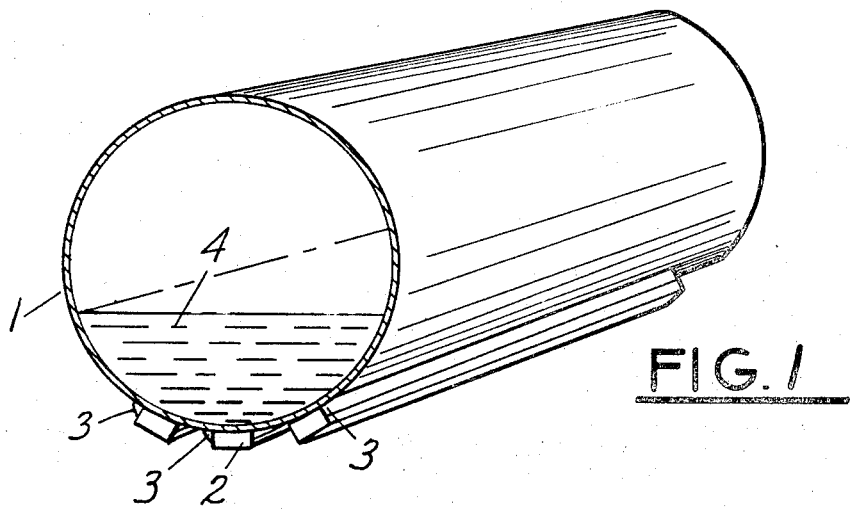
Figure 2:
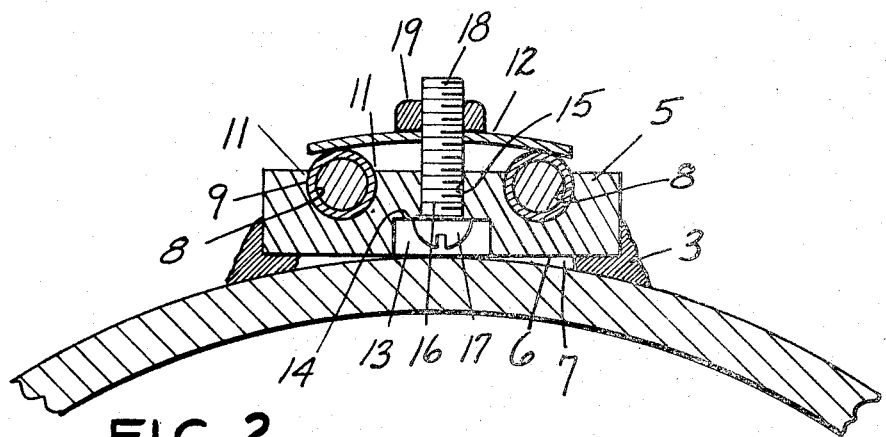
Figure 3:
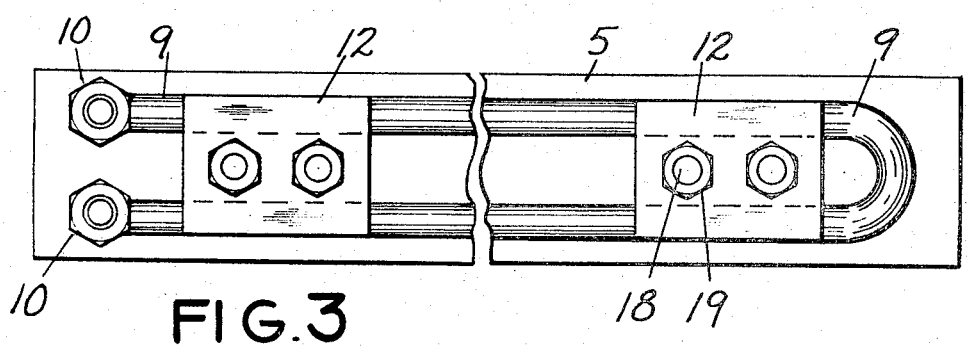

In the drawing, FIG. 1 is a diagrammatic perspective of an electrically heated vessel, FIG. 2 is a fragmentary section through one of the heating elements and the associated wall of the vessel, and FIG. 3 is a plan view of one of the heating elements.

In FIG. 1 there is diagrammatically shown a vessel 1 having aluminum walls heated by three electric heating element assemblies 2 attached by welds 3 to the outer surface of the vessel below the water level 4. The particular vessel is a steam generator and is therefore only partially filled with water and the heating elements are located in the lowermost portions of the vessel so as to be in good heat transfer relation to the water. In the case of vessels completely filled with liquid, the heating elements need not be on the lowermost surfaces of the vessel.

As shown in FIGS. 2 and 3, the heating element assemblies comprise elongated strips or bars 5 of aluminum having flat under surfaces 6 presented to the outer surface of the aluminum wall of the vessel. Since the bars 5 are relatively narrow compared to the radius of curvature of the vessel, it is not necessary that the under surface of the strips 5 be correspondingly curved. In fact, it is advantageous to have a slight separation such as indicated at 7 between the edges of the bars and the exterior surface of the vessel. When the bars 5 are arc welded to the vessel, the weld fillet 3 penetrates into the space 7 and provides additional heat transfer. Once the strips 5 are welded to the vessel, excellent heat transfer is established through the welds 3. The heat transfer is as good as though the heating elements were cast integrally with the walls of the vessel.

In the exterior surface of the bars 5 are elongated grooves 8 for a sheathed electric heating element 9. For the particularly strip heater shown, there are two grooves 8 and the sheathed heating element 9 is in the form of a loop having end terminals 10. Other shapes of heating elements may be used. It is desirable, although not necessary, that the grooves 5 have a circumferential extent slightly more than 180° to provide detent shoulders 11 which assist in holding the heating element in place. When inserted, the heating element snaps past the detent shoulders and is releasably held in the groove 8.

The heat transfer from the heating element to the bar 5 is improved through clamps 12 which tightly hold the heating element against the bottoms of the grooves 8. The structure is such that the clamping force increases as the heating element becomes hotter, thereby providing a desirable increase in conductivity which prevents overheating of the heating elements. To effect the clamping, the under side of the bars 5 is provided with recesses 13 and the bottoms 14 of the recesses are provided with tapped holes 15 for screws 16. The heads 17 of the screws are confined between the bottoms 14 of the recesses and the exterior surface of the wall of the vessel 1. The free ends 18 of the screws extend through the clamps and have nuts 19 for tightening the clamps against the heating elements. Because the screws are threaded into the tapped holes 15, the screws are securely held in place under both tightening and loosening torque applied to the nuts 19. Tightening torque brings the heads 17 of the screws against the bottom of the recess 13. Loosening torque brings the heads 17 of the screws against the outer surface of the vessel. The screws are preferably of a material such as steel having a lower coefficient of expansion than the strips 5. The steel screws also provide the high strength desirable to withstand the high clamping forces built up by the differential thermal expansion.

Because of the high heat transfer provided by the arc weld fillets 3 and the force of the clamps 12, the performance of the heat heating elements is substantially that of the cast units. However, if any of the heating elements 9 should burn out, they may easily be replaced in the field without disturbing the welds to the vessel.

What is claimed as new is:

1. A vessel having an aluminum wall with a curved exterior surface, an elongated aluminum bar having a flat under surface presented to said exterior surface, said bar being relatively narrow compared to the radius of curvature of said surface, said bar having one side presented to and having edges arc welded to said exterior surface of the wall and having a groove in the opposite sides, a sheathed electric heating element fitting in said groove, screws threaded into the bar and having bodies projecting from said opposite side of the bar and having heads presented to said wall, said screws having a coefficient of thermal expansion less than aluminum, a clamp for pressing the heating element into the groove, and nuts on said screws for tightening the clamp, the differential in thermal expansion between the screws and the aluminum tightening the clamp at operating temperature to improve the heat transfer.

2. A vessel having an aluminum wall with a curved exterior surface, an elongated aluminum bar having a flat under surface presented to said exterior surface, said bar being relatively narrow compared to the radius of curvature of said surface, said bar having one side presented to and having edges arc welded to said exterior surface of the wall and having a groove in the opposite side, a sheathed electric heating element fitting in said groove, screws threaded into the bar and having bodies projecting from said opposite side of the bar and having heads presented to said wall, said bar being recessed on said one side to receive the heads of the screws, said screws having a coefficient of thermal expansion less than aluminum, a clamp for pressing the heating element into the groove, and nuts on said screws for tightening the clamp, the differential in thermal expansion between the screws and the aluminum tightening the clamp at operating temperature to improve the heat transfer.

3. A vessel having an aluminum wall with a curved exterior surface, an elongated aluminum bar having a flat under surface presented to said exterior surface, said bar being relatively narrow compared to the radius of curvature of said surface, said bar having one side presented to and having edges arc welded to said exterior surface of the wall and having a groove in the opposite side, a sheathed electric heating element fitting in said groove, screws having bodies projecting from said opposite side of the bar and having heads presented to said wall, said bar being recessed on said one side to receive the heads of the screws, said screws having a coefficient of thermal expansion less than aluminum, a clamp for pressing the heating element into the groove, and nuts on said screws for tightening the clamp, the differential in thermal expansion between the screws and the aluminum tightening the clamp at operating temperature to improve the heat transfer.

4. A vessel having an aluminum wall with a curved exterior surface, an elongated aluminum bar having a flat under surface presented to said exterior surface, said bar being relatively narrow compared to the radius of curvature of said surface, said bar having one side presented to and having edges arc welded to said exterior surface of the wall and having a groove in the opposite side, a sheathed electric heating element fitting in said groove, studs each having one end fixed in said bar and having its opposite end screws threaded and projecting from said opposite side of the bar, a clamp for pressing the heating element into the groove, and nuts on said studs for tightening the clamp, the differential in thermal expansion between the studs and the aluminum tightening the clamp at operating temperature to improve the heat transfer.

References Cited

UNITED STATES PATENTS

| | | | |
|---|---|---|---|
| 1,864,887 | 6/1932 | Bodenstab | 219—315 |
| 1,975,464 | 10/1934 | Juengst et al. | 219—436 |
| 2,772,344 | 11/1956 | Bowen et al. | 219—311 |
| 3,010,006 | 11/1961 | Schwancke | 219—442 |
| 3,045,098 | 7/1962 | Norton | 219—535 |

RICHARD M. WOOD, *Primary Examiner.*

C. ALBRITTON, *Assistant Examiner.*